(12) United States Patent
Teraoka et al.

(10) Patent No.: US 10,056,616 B2
(45) Date of Patent: Aug. 21, 2018

(54) MANUFACTURING METHOD OF ELECTRODE ASSEMBLY, ELECTRODE ASSEMBLY AND BATTERY

(71) Applicant: SEIKO EPSON CORPORATION, Tokyo (JP)

(72) Inventors: Tsutomu Teraoka, Matsumoto (JP); Tomofumi Yokoyama, Matsumoto (JP); Hirofumi Hokari, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 479 days.

(21) Appl. No.: 14/613,773

(22) Filed: Feb. 4, 2015

(65) Prior Publication Data

US 2015/0228981 A1 Aug. 13, 2015

(30) Foreign Application Priority Data

Feb. 10, 2014 (JP) ................................ 2014-023258

(51) Int. Cl.
| | | |
|---|---|---|
| *H01M 6/00* | (2006.01) | |
| *H01M 4/62* | (2006.01) | |
| *H01M 4/131* | (2010.01) | |
| *H01M 4/1391* | (2010.01) | |
| *H01M 4/36* | (2006.01) | |

(Continued)

(52) U.S. Cl.
CPC ........... *H01M 4/628* (2013.01); *H01M 4/131* (2013.01); *H01M 4/1391* (2013.01); *H01M 4/366* (2013.01); *H01M 4/62* (2013.01); *H01M 10/052* (2013.01); *H01M 10/058* (2013.01); *H01M 10/0525* (2013.01); *H01M 10/0562* (2013.01); *H01M 10/0565* (2013.01); *H01M 4/0471* (2013.01); *H01M 2220/20* (2013.01); *Y02T 10/7011* (2013.01); *Y10T 29/49108* (2015.01)

(58) Field of Classification Search
CPC .... H01M 4/131; H01M 4/628; H01M 4/1391; H01M 4/366; H01M 4/62; H01M 4/0471; H01M 10/052; H01M 10/0525; H01M 10/0565; H01M 10/058; H01M 2220/20; Y02E 60/122

See application file for complete search history.

(56) References Cited

U.S. PATENT DOCUMENTS

| 6,451,487 B1 | 9/2002 | Besner et al. |
| 2004/0096745 A1 | 5/2004 | Shibano et al. |

(Continued)

FOREIGN PATENT DOCUMENTS

| JP | H08-287949 A | 11/1996 |
| JP | 2000-348711 A | 12/2000 |

(Continued)

OTHER PUBLICATIONS

Jun. 22, 2015 Search Report issued in European Application No. 15154108.3.

*Primary Examiner* — Raymond Alejandro

(74) *Attorney, Agent, or Firm* — Oliff PLC

(57) ABSTRACT

A manufacturing method of an electrode assembly includes forming an active material molded body which contains lithium double oxide and includes plural voids, forming a solid electrolyte in the plural voids, and attaching a polymer gel film impregnated with an electrolytic solution for conducting lithium ions to the active material molded body in which the solid electrolyte is formed.

13 Claims, 4 Drawing Sheets

(51) Int. Cl.
*H01M 10/052* (2010.01)
*H01M 10/0562* (2010.01)
*H01M 10/0565* (2010.01)
*H01M 10/0525* (2010.01)
*H01M 10/058* (2010.01)
*H01M 4/04* (2006.01)

(56) References Cited

U.S. PATENT DOCUMENTS

| | | | |
|---|---|---|---|
| 2012/0021279 | A1 | 1/2012 | Le Bideau et al. |
| 2012/0245387 | A1* | 9/2012 | Sundermeyer ........ C07C 307/00 564/97 |
| 2013/0177798 | A1* | 7/2013 | Ueda ................... H01M 10/052 429/127 |
| 2013/0236764 | A1 | 9/2013 | Hu et al. |
| 2013/0260225 | A1* | 10/2013 | Doe ...................... H01M 4/381 429/188 |
| 2014/0065489 | A1* | 3/2014 | Saimen ................. H01M 4/622 429/303 |
| 2015/0050529 | A1* | 2/2015 | Albertus ........... H01M 10/5024 429/50 |

FOREIGN PATENT DOCUMENTS

| | | |
|---|---|---|
| JP | 2003-272706 A | 9/2003 |
| JP | 2004-179158 A | 6/2004 |
| JP | 2006-260887 A | 9/2006 |
| JP | 2006-277997 A | 10/2006 |
| JP | 2010-080404 A | 4/2010 |
| JP | 4615339 B2 | 1/2011 |
| JP | 2013-093126 A | 5/2013 |

\* cited by examiner

MANUFACTURING METHOD OF ELECTRODE ASSEMBLY, ELECTRODE ASSEMBLY AND BATTERY

This application claims a priority to Japanese Patent Application No. 2014-023258 filed on Feb. 10, 2014 which is hereby expressly incorporated by reference in its entirety.

BACKGROUND

1. Technical Field

Several aspects of the present invention relate to a manufacturing method of an electrode assembly, an electrode assembly and a battery.

2. Related Art

A lithium battery using lithium or lithium-containing material as a negative electrode is lightweight and has a high capacity, and further, a high voltage can be obtained by combination with a suitable positive electrode. Thus, the lithium battery is widely used as a battery for a portable electric equipment, a camera, a watch, an electric tool, a hybrid vehicle and the like. However, in the lithium battery, since lithium has high activity and an organic electrolytic solution is used, fire and explosion can occur at short-circuit. Accordingly, in the design of the lithium battery, securement of safety is an important problem.

One of methods of enhancing the safety is not to use an electrolytic solution (ceasing of use of electrolytic solution). As one of attempts to cease the use of electrolytic solution, a lithium polymer battery using a gel polymer electrolyte is developed. However, since the gel polymer electrolyte is such that an organic electrolyte is impregnated in the polymer gel, there is yet a problem of fire and explosion.

As another attempt to cease the use of electrolytic solution, a lithium battery using a ceramic electrolyte (inorganic solid electrolyte) is developed (see, for example, JP-A-2006-277997 (Patent Literature 1), JP-A-2004-179158 (Patent Literature 2), Japanese Patent No. 4615339 (Patent Literature 3)). When the ceramic electrolyte is used, since ions moving in the electrolyte by a battery reaction become only lithium ions, a side reaction hardly occurs. Besides, since a combustible organic solution is not used, a seal member and a liquid sealing structure are not required, and more reduction in size and thickness becomes possible.

In the technique disclosed in Patent Literature 1, there is a problem that contact at an interface between a ceramic electrolyte powder and an electrode active material or an interface between a ceramic electrolyte powder and a ceramic electrolyte powder becomes insufficient, and an excellent battery output can not be obtained. Further, there is a problem that the interface contact becomes unstable by volume change due to a charge-discharge cycle, and the cycle life is deteriorated.

In the technique disclosed in Patent Literature 2, there is a problem that manufacture of a battery having sufficient capacity is difficult. In order to obtain sufficient capacity for the battery, manufacture of an active material having a total thickness of more than 100 μm is required. However, according to the technique of Patent Literature 2, the manufacture of the active material having a thickness of more than 100 μm is difficult.

In the technique disclosed in Patent Literature 3, there is a problem that $Li_{0.35}La_{0.55}TiO_2$ as a solid electrolyte and $LiCoO_2$ as a battery active material diffuse in solid phase in a manufacture process, and electric characteristics are deteriorated.

SUMMARY

An advantage of some aspect of the invention is to provide a lithium battery which is safer, can obtain sufficient output and can increase capacity, and a manufacturing method of the lithium battery.

An aspect of the invention provides a manufacturing method of an electrode assembly including forming an active material molded body which contains lithium double oxide and includes plural voids, forming a solid electrolyte in the plural voids, and attaching a polymer gel film impregnated with an electrolytic solution for conducting lithium ions to the active material molded body in which the solid electrolyte is formed.

According to the manufacturing method, the lithium battery which is safer, can obtain sufficient output and can increase capacity can be manufactured.

The electrolytic solution may contain Li-TFSI and P13-TFSI.

The solid electrolyte may contain $Li_{0.35}La_{0.35}TiO_3$.

The active material molded body may contain $LiCoO_2$.

Another aspect of the invention provides an electrode assembly including an active material molded body which contains lithium double oxide and includes plural voids, a solid electrolyte provided in the plural voids, and a polymer gel film attached to a composite of the active material molded body and the solid electrolyte and impregnated with an electrolytic solution for conducting lithium ions.

According to the electrode assembly, the lithium battery which is safer, can obtain sufficient output and can increase capacity can be manufactured.

Still another aspect of the invention provides a battery including the electrode assembly described above.

According to the battery, safety is improved, sufficient output can be obtained, and capacity can be increased.

BRIEF DESCRIPTION OF THE DRAWINGS

The invention will be described with reference to the accompanying drawings, wherein like numbers reference like elements.

DESCRIPTION OF EXEMPLARY EMBODIMENTS

1. Structure

Figure 1:
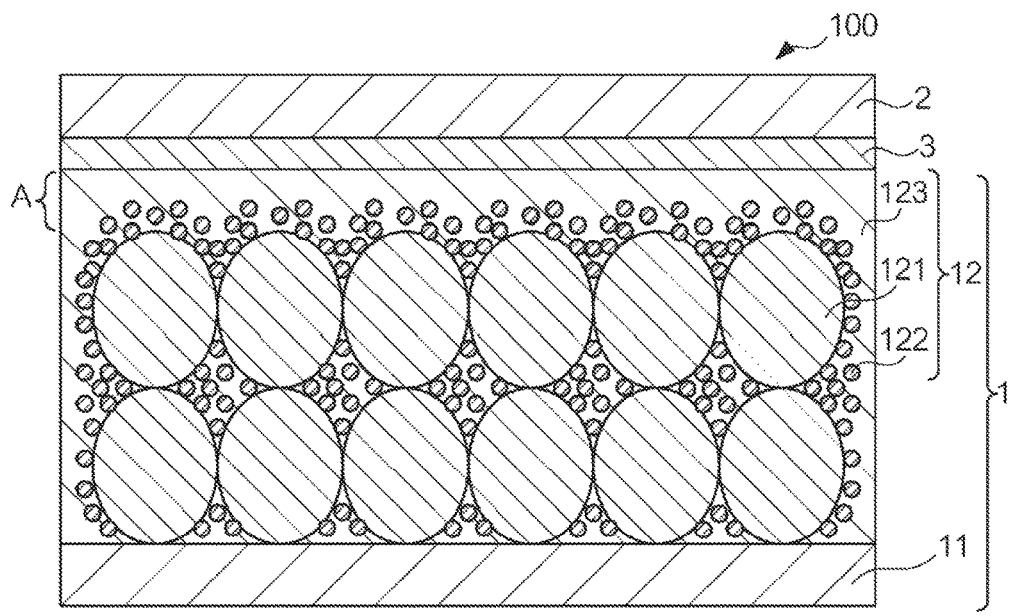
FIG. 1 is a sectional schematic view showing a structure of a lithium battery 100 of an embodiment.

FIG. 1 is a sectional schematic view showing a structure of a lithium battery 100 of an embodiment. The lithium battery 100 includes an electrode assembly 1, an electrode 2, and a polymer gel electrolyte (hereinafter referred to as PGE) film 3. The electrode assembly 1 functions as a positive electrode or a negative electrode according to an active material to be used. The electrode 2 is an electrode having a polarity opposite to the electrode assembly 1. The lithium battery 100 is a so-called solid lithium ion secondary battery. Incidentally, the lithium battery 100 may be used as a primary battery.

The electrode assembly 1 includes a current collector 11 and a composite 12. The composite 12 includes an active material molded body 121 and a solid electrolyte 122. An electrolytic solution 123 will be described later. Incidentally, FIG. 1 schematically shows the structure of the lithium battery 100, and for example, the shape and size of the active material molded body 121 and the solid electrolyte 122 are merely schematic.

The current collector 11 is an electrode for extracting current generated by a battery reaction. The current collector 11 is provided on one surface of the composite 12. The active material molded body 121 is exposed on the surface. That is, the current collector 11 contacts the active material molded body 121. The current collector 11 is made of one kind of single metal selected from a group including copper (Cu), magnesium (Mg), titanium (Ti), iron (Fe), cobalt (Co), nickel (Ni), zinc (Zn), aluminum (Al), germanium (Ge), indium (In), gold (Au), platinum (Pt), silver (Ag) and palladium (Pd), or an alloy including two or more kinds of metals selected from the group. The shape of the current collector 11 is, for example, a plate shape, a foil shape or a net shape. The surface of the current collector 11 may be smooth or may be roughened.

The active material molded body 121 is a molded body containing an electrode active material. The active material molded body 121 is porous, and includes plural voids (pores) therein. These voids communicate with each other in the inside of the active material molded body 121. An inorganic material is used as the electrode active material. The current collector can be made a positive electrode or a negative electrode according to the material used for the active material molded body 121.

When the current collector 11 is used as the positive electrode, for example, lithium double oxide is used as the material of the active material molded body 121. The lithium double oxide is an oxide containing two or more kinds of metals including lithium, and is not an oxo-acid. As the lithium double oxide, for example, $LiCoO_2$, $LiNiO_2$, $LiMn_2O_4$, $Li_2Mn_2O_3$, $LiFePO_4$, $Li_2FeP_2O_7$, $LiMnPO_4$, $LiFeBO_3$, $Li\ V2(PO_4)_3$, $Li_2CuO_2$, $Li_2FeSiO_4$, $Li_2MnSiO_4$ and the like are enumerated. Besides, other than the lithium double oxide, lithium double fluoride such as $LiFeF_3$ may be used. Besides, the lithium double oxide includes one in which an atom in the crystal of the lithium double oxide is replaced by another transition metal, typical metal, alkali metal, alkaline rare earth metal, lanthanoid, chalcogenide, halogen or the like. A solid solution of these may be used as the positive active material.

When the current collector 11 is used as the negative electrode, for example, lithium double oxide such as $Li_4Ti_5O_{12}$ or $Li_2Ti_3O_7$ is used as the material of the active material molded body 121.

From the viewpoint of increasing the contact area between the active material molded body 121 and the solid electrolyte 122, the percentage of voids of the active material molded body 121 is preferably 10% or more and 50% or less, and is more preferably 30% or more and 50% or less. The capacity of the lithium battery 100 can be further increased by enlarging the contact area between the active material molded body 121 and the solid electrolyte 122.

The percentage of voids ry is calculated by following expression (1).

$$r_v = \left(1 - \frac{m}{Vg \cdot \rho}\right) \times 100 \qquad (1)$$

Here, vg denotes an apparent volume of the active material molded body 121. The apparent volume is calculated from the outer size of the active material molded body 121 and includes the voids. Besides, m denotes the mass of the active material molded body 121, and ρ denotes the density of the active material constituting the active material molded body 121. Although the details will be described later, the percentage of voids of the active material molded body 121 can be controlled by using a pore forming material in the process of forming the active material molded body 121.

From the viewpoint of increasing the output of the lithium battery 100, the resistivity of the active material molded body 121 is preferably 700 Ω/cm or less. The resistivity is obtained by, for example, DC polarization measurement. In the DC polarization measurement, for example, a copper foil is attached to the surface of the active material molded body 121 and this copper foil is used as an electrode.

The solid electrolyte 122 is filled in the voids of the active material molded body 121. The filling ratio of the solid electrolyte 122 to the voids of the active material molded body 121 is preferably high and is, for example, 60% or more and 90% or less.

As the solid electrolyte 122, for example, an oxide, a sulfide, a halide or a nitride is used. Specifically, as the solid electrolyte, at least one of $Li_{0.35}La_{0.55}TiO_3$, $SiO_2$—$P_2O_5$—$Li_2O$, $SiO_2$—$P_2O_5$—$LiCl$, $Li_2O$—$LiCl$—$B_2O_3$, $Li_{3.4}V_{0.6}Si_{0.4}O_4$, $Li_{14}ZnGe_4O_{16}$, $Li_{3.6}V_{0.4}Ge_{0.6}O_4$, $Li_{1.3}Ti_{1.7}Al_{0.3}(PO_4)_3$, $Li_{2.88}PO_{3.73}N_{0.14}$, $LiNbO_3$, $Li_2La_3Zr_2O_{12}$, $Li_2S$—$SiS_2$, $Li_2S$—$SiS_2$—$LiI$, $Li_2S$—$SiS_2$—$P_2S_5$, $LiPON$, $Li_3N$, $LiI$, $LiI$—$CaI_2$, $LiI$—$CaO$, $LiAlCl_4$, $LiAlF_4$, $LiI$—$Al_2O_3$, $LiFAl_2O_3$, $LiBr$—$Al_2O_3$, $Li_2O$—$TiO_2$, $La_2O_3$—$Li_2O$—$TiO_2$, $Li_3N$, $Li_2NI_2$, $Li_3N$—$LiI$—$LiOH$, $Li_3N$—$LiCl$, $Li\ NBr_3$, $LiSO_4$, $Li_4SiO_4$, $Li_3PO_4$—$Li_4SiO_4$, $Li_4GeO_4$—$Li\ VO_4$, $Li_4SiO_4$—$Li_3VO_4$, $Li_4GeO_4$—$Zn_2GeO_2$, $Li_4SiO_4$—$LiMoO_4$, $Li_3PO_4$—$Li_4SiO_4$ and $LiSiO_4$—$Li_4ZrO_4$ is used. The solid electrolyte may be crystalline or amorphous. Besides, a solid solution in which an atom in the composition is replaced by another transition metal, typical metal, alkali metal, alkaline rare earth metal, lanthanoid, chalcogenide, halogen or the like may be used as the solid electrolyte.

From the viewpoint of increasing the capacity of the lithium battery 100, the ion conductivity of the solid electrolyte 122 is preferably $1 \times 10^{-5}$ S/cm or more. If the ion conductivity is low, only active materials near the surface layer of the active material molded body 121 contribute to the battery reaction, ions of the solid electrolyte 122 can not be effectively used, and the capacity of the lithium battery 100 does not become high. If the ion conductivity is high, ions contained in the solid electrolyte 122 at a position remote from the surface of the active material molded body 121 also reach the surface of the active material molded body 121 and can contribute to the battery reaction. That is, the coefficient of use of the active material in the active material molded body 121 is improved, and the capacity of the lithium battery 100 can be increased.

Here, the ion conductivity of the solid electrolyte 122 is the total ion conductivity which is the total of bulk conductivity as the conductivity of the inorganic electrolyte itself and grain boundary ion conductivity as conductivity between crystal grains in the case where the inorganic electrolyte is crystalline.

The ion conductivity of the solid electrolyte 122 is measured by, for example, an AC impedance method. The measurement is performed by using, for example, a sample in which electrodes are formed on both surfaces of a solid electrolyte molded into a specified shape (for example, tablet shape). More specifically, solid electrolyte powder is press-molded into the tablet shape at 624 MPa. The press molded body is sintered for 8 hours at 700° C. in air atmosphere. A metal (for example, platinum) with a specified shape (for example, a circle with a diameter of 0.5 cm and a thickness of 100 nm) is formed on the sinter body by sputtering. The measurement is performed by using, for example, an impedance analyzer (SI1260 made by Solartron Co., Ltd.).

The thickness of the composite 12 is designed according to the capacity of the lithium battery 100. The thickness of the composite 12 is, for example, 80 to 300 μm, and is preferably 100 μm or more. The composite 12 includes an area not containing the active material molded body 121 at the side opposite to the current collector 11 (area A of FIG. 1). That is, when seen from the current collector 11, if a direction in which the composite 12 is formed is upward, an upper surface 3a of the solid electrolyte 122 is positioned above an upper end position 2a of the active material molded body 121. By providing the area not containing the active material molded body 121 as stated above, when the electrode is provided on the surface 3a, a short circuit between the electrode and the current collector 11 through the active material molded body 121 can be prevented.

A surface of the composite 12, which contacts the current collector 11, is a polished surface polished at the time of manufacture, and the active material molded body 121 is exposed from the solid electrolyte 122. Scratches (polishing scars) as traces of polishing remain on this surface.

The electrode assembly 1 is molded without using a binder for binding active materials and a conductive assistant for securing the conductivity of the active material molded body 121 for ensuring conductivity of the active material molded body 121, and is made of almost only inorganic material. Specifically, in the electrode assembly 1 of the embodiment, amass reduction rate obtained when the composite 12 (the active material molded body 121 and the solid electrolyte 122) is heated for 30 minutes at 400° C. is 5 mass % or less. The mass reduction rate is preferably 3 mass % or less, and is more preferably 1 mass % or less, and is particularly preferable if the mass reduction is not observed or is within an error range.

The mass reduction rate of the composite 12 is measured by using a thermogravimetry-differential thermal analysis apparatus (TG-DTA). The composite 12 is heated under a specified heating condition, and the mass of the composite 12 after the heating is measured. The mass reduction rate can be calculated from the ratio of masses before and after the heating.

In the active material molded body 121, the plural voids communicate with each other in a mesh shape in the inside thereof. For example, $LiCoO_2$ as an example of the positive active material is known to have anisotropy in electron conductivity of crystal. Thus, when the voids extend in a specific direction, a state where electron conduction is hard can occur according to a relation between the direction in which the voids extend and crystal orientation. However, that the voids communicate with each other in a mesh shape means that the active materials are also isotropically connected, and an electrochemically smooth continuous surface can be formed. Thus, as compared with the case where voids are anisotropically formed, excellent electron conductivity can be obtained. In another example, the active material molded body 121 may be made of glass fibers.

Besides, the active material molded body 121 includes many voids therein, and the surface area is large. Thus, the contact area between the active material molded body 121 and the solid electrolyte 122 is large, and the interface impedance can be reduced. Incidentally, in the electrode assembly 1, the contact area between the active material molded body 121 and the solid electrolyte layer 3 is larger than the contact area between the current collector 11 and the active material molded body 121. Charge transfer in the interface between the current collector 11 and the active material molded body 121 is easier than that in the interface between the active material molded body 121 and the solid electrolyte layer 3. Thus, if the contact areas are almost equal to each other, the interface between the active material molded body 121 and the solid electrolyte 122 becomes a bottle neck for charge transfer. However, if the contact area between the active material molded body 121 and the solid electrolyte 122 is larger, the bottle neck can be easily solved.

The PGE film 3 is a lithium resistant film and a film functioning as a supply source of polymer gel electrolyte. The PGE film 3 is a film impregnated with an electrolytic solution for conducting lithium ions. The PGE film 3 includes a support and a polymer gel electrolyte.

The support is for physically supporting the structure of the PGE film 3. The support preferably does not deposit impurities, does not react with another material such as the polymer gel electrolyte, and has high wettability to ionic liquid+Li salt+monomer. If impurities are deposited or chemical reaction occurs, there is a fear that the characteristics change. Besides, if the wettability is low, there is a fear that macromolecules can not be uniformly formed on the support. Incidentally, the intensity can be improved by raising the ratio of the polymer component in the polymer gel electrolyte without using the support. However, if the ratio of the polymer component is raised, the conductivity of Li is lowered, and therefore, the support is preferably used. As the support, for example, long-fiber cellulose or hydrophobic PVDF (polyvinylidene fluoride) is used.

The polymer gel electrolyte is required to have characteristics of being chemically stable to Li and of capable of holding an electrolytic solution by gelation. A normal PEG (polyethylene glycol) film becomes a lithium resistant reduction layer for suppressing reduction, and the battery operation can be confirmed. However, in the PEG film, improvement of ion conductivity can not be expected, and a practical output as a battery can not be obtained. In order to obtain the practical output as the battery, the conductivity of Li is required to be improved. Then, in this embodiment, the gel polymer electrolyte in which the electrolytic solution does not volatilize is used.

When the active material molded body 121 is formed of a positive active material, the current collector 11 is formed of, for example, aluminum. The electrode 2 is formed of a material functioning as a negative electrode, for example, lithium.

2. Manufacturing Method

Figure 2:
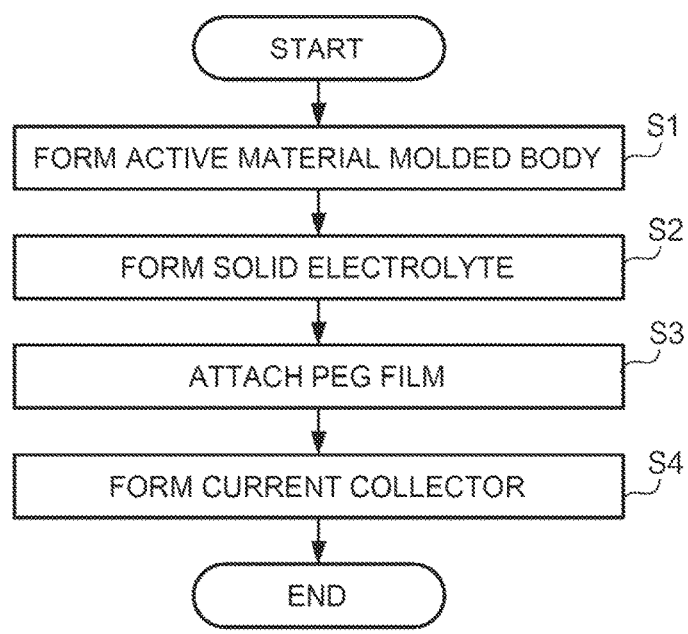
FIG. 2 is a flowchart showing a manufacturing method of an electrode assembly 1.

FIG. 2 is a flowchart showing a manufacturing method of the electrode assembly 1. FIGS. 3 to 6 are schematic views showing states after respective processes.

At step S1, the active material molded body 121 is formed. Specifically, the following is performed. First, a granular (powder) active material (lithium double oxide) is prepared. An average particle size (D50) of the active material is preferably, for example, 300 nm or more and 5 µm or less, and is more preferably 2 µm or more and 5 µm or less. The average particle size is measured by using a light scattering type particle size distribution measuring apparatus (for example, nanotruck UPA-EX250 made by NIKKISO CO., LTD.) after particles of the active material are dispersed in n-octanol so that the concentration becomes 0.1 to 10 mass %. If the average particle size is excessively small, the void becomes small and the electrolyte becomes hard to be filled. On the other hand, if the average particle size is excessively large, the surface area of the active material molded body 121 becomes small, and the output of the lithium battery 100 becomes low.

Figure 3:
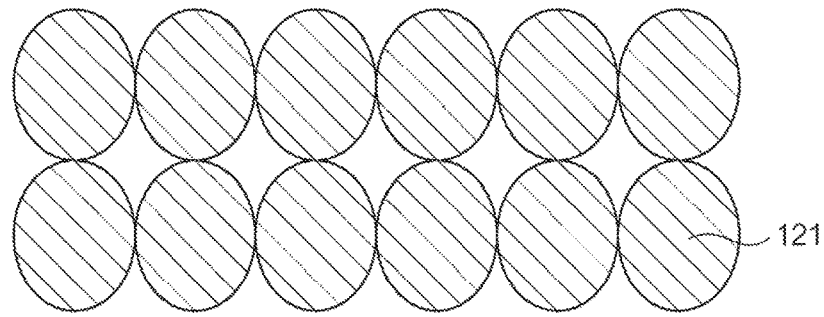
FIG. 3 is a view showing a state after step S1.

Next, the active material is filled in a mold, and is compression molded. Further, the compressed body is heat treated and sintered, so that the active material molded body 121 is obtained (FIG. 3). This heat treatment is performed under a temperature condition of 850° C. or higher and a temperature lower than the melting point and decomposition point of lithium double oxide used as the active material. For example, the heat treatment is preferably performed at 875° C. or higher and 1000° C. or lower, and is more preferably performed at 900° C. or higher and 920° C. or lower. Further, the heat treatment is preferably performed for 5 minutes or more and 36 hours or less, and is more preferably performed for 4 hours or more and 14 hours or less.

Incidentally, the active material may be added with a high molecular compound functioning as a binder. As the high molecular compound, for example, polyvinylidene fluoride (PVdF) and polyvinyl alcohol (PVA) can be enumerated. These high molecular compounds are burned or oxidized in the heat treatment of this process, and the amount is reduced.

Further, the active material may be added with a pore forming material. The pore forming material is a material (for example, high molecular compound or carbon powder) which becomes a mold of voids. The percentage of voids of the active material molded body 121 can be controlled by adding the pore forming material. The pore forming material is burned or oxidized in the heat treatment of this process, and the amount is reduced. An average particle size of the pore forming material is preferably 0.5 to 10 µm. The pore forming material may include particles made of a material having deliquescence. Water generated by deliquescence of the particles functions as a binder for binding the granular lithium double oxide. Accordingly, the shape of the compressed body can be kept during a period from the compression molding of the granular active material to the heat treatment.

At step S2, the solid electrolyte 122 is formed in the voids of the active material molded body 121. Specifically, the following is performed. First, a precursor of the solid electrolyte 122 is prepared. As the precursor, for example, one of followings (A) to (C) is used.

(A) A composition including a salt which contains metal atoms at a ratio in accordance with composition of the solid electrolyte 122 and becomes the solid electrolyte 122 by oxidization.

(B) A composition including metal alkoxide containing metal atoms at a ratio in accordance with composition of the solid electrolyte 122.

(C) A dispersion liquid in which fine particle sol containing solid electrolyte fine particles or metal atoms at a ratio in accordance with composition of the solid electrolyte 122 is dispersed in a solvent or (A) or (B).

Incidentally, the salt included in (A) includes a metal complex. Besides, (B) is the precursor in the case where the solid electrolyte is formed by using the so-called sol-gel method. Here, the precursor is diluted with a solvent and is used as a precursor solution.

Figure 4A:
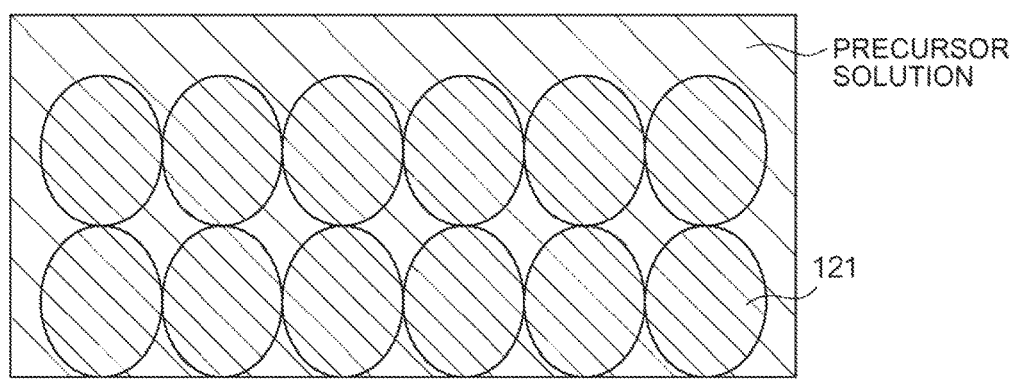
FIGS. 4A and 4B are views showing a state after step S2.

Next, the precursor solution is made to be impregnated (permeated) in the voids of the active material molded body 121. Specifically, for example, the precursor solution is dropped onto the active material molded body 121 (FIG. 4A). Alternatively, the active material molded body 121 may be dipped into the precursor solution. In another example, the precursor solution may be applied to the active material molded body 121. In still another example, the precursor solution is made to contact an end of the active material molded body 121, and the precursor may be impregnated in the voids of the active material molded body 121 by using the capillary phenomenon. At this time, the impregnation of the precursor solution may be promoted by pressurizing the atmosphere of the active material molded body 121 or the precursor.

Figure 4B:
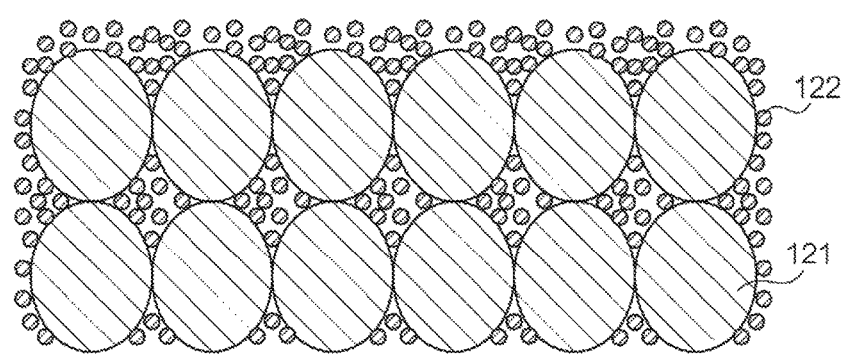

Next, the precursor is burned and the solid electrolyte 122 is obtained (FIG. 4B). Before the burning, the solvent may be removed. The removal of the solvent is performed by using at least one of normally known methods such as heating, depressurizing and blowing. The burning of the precursor is performed in the air atmosphere and at a temperature lower than the heat treatment for obtaining the active material molded body 121. The burning temperature is, for example, within a range of 300° C. or higher and 700° C. or lower. If the burning temperature is excessively high, an electrochemically inactive byproduct may be generated by a solid phase reaction at an interface between the active material molded body 121 and the solid electrolyte layer 3. The byproduct exerts a bad influence on the characteristics of the lithium battery 100. Besides, if the burning temperature is excessively low, crystallinity of the solid electrolyte 122 is poor and sufficient ion conductivity may not be obtained.

The solid electrolyte 122 is formed by the method of impregnating the precursor solution with fluidity into the voids of the active material molded body 121. However, the precursor solution can not be impregnated into all the voids, and the volume is reduced in the process of burning the precursor solution. Thus, after the solid electrolyte 122 is formed, voids still remain in the composite of the active material molded body 121 and the solid electrolyte 122.

Figure 5:
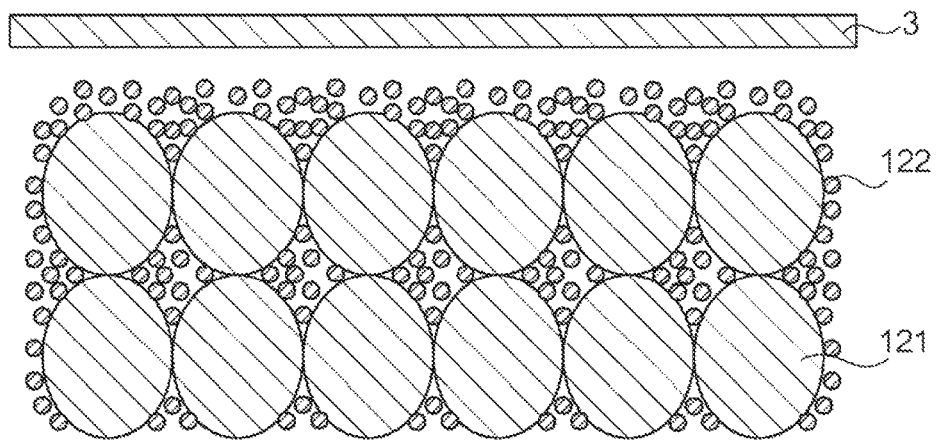
FIG. 5 is a view showing a state after step S3.

At step S3, the PGE film 3 is attached to a surface of the composite of the active material molded body 121 and the solid electrolyte 122 (FIG. 5). The PGE film 3 is formed by, for example, causing a support (base member) to be impregnated with the precursor solution containing an electrolytic solution and a monomer and by photopolymerizing this. The electrolytic solution contains an ionic liquid and a lithium salt. As the ionic liquid, for example, P13-TFSI (N-methyl-N-propyl pyrrolidinium bis(trifluoromethane sulfonyl)imide) is used. As the lithium salt, Li-TFSI (lithium N, N-bis (trifluoromethane sulfonyl) imide) is used. As the monomer, for example, polyethylene glycol diacrylate (TEGDA) is used. The PGE preparation solution is obtained by mixing a polymerization initiator and ethylene carbonate into the electrolytic solution. As the polymerization initiator, for example, a radical photopolymerization initiator (for example, IRGACURE651, 2, 2-dimethoxy-1, 2-diphenylethane-1-on made by BASF Corporation) is used. The polymerization initiator is mixed at, for example, a mixture ratio of of 6:1 in weight ratio. The ethylene carbonate is used as a SEI (Solid Electrolyte Interface) forming material. The SEI is a coated film for inactivating and stabilizing the surface of the Li electrode. The SEI is generated by a reducing decomposition reaction of the electrolytic solution, and it is confirmed that charge is consumed by the decomposition reaction of the ethylene carbonate in the first cycle. The ethylene carbonate is mixed at a mixture ratio of 1. The PGE preparation solution is impregnated in the support. As the support, for example, a hydrophobic PVDF membrane filter made by MILLIPORE Corporation is used. A light (for example, ultraviolet light) in a specified wavelength band is irradiated to the support impregnated with the PGE preparation solution, so that the monomer is photo-polymerized and is polymerized, and the PGE film 3 is obtained. The electrolytic solution contained in the PGE film 3 is the electrolytic solution 123.

Figure 6:
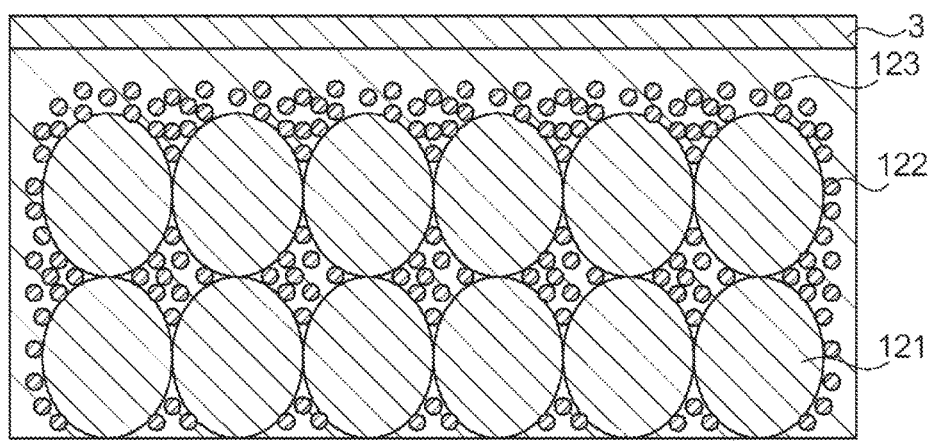
FIG. 6 is a view showing a state in which an electrolytic solution exudes.

The electrolytic solution 123 contained in the PGE film 3 has good wettability to the solid electrolyte ($Li_{0.35}La_{0.55}TiO_3$), and impregnates into the inside of the composite 12 through the solid electrolyte 122 (FIG. 6).

At step S4, the current collector 11 is formed on the composite 12, and the electrode assembly 1 is obtained. Specifically, first, the surface of the composite 12 is polished. The previously molded current collector 11 is connected to the polished surface. Alternatively, the current collector 11 may be formed on the composite 12 by using a well-known process. As the film formation process, for example, a physical vapor deposition method (PVD) or a chemical vapor deposition method (CVD) is used.

Incidentally, when the composite 12 is formed, the active material molded body 121 may be exposed on the surface of the composite 12 in contact with the mount surface. In this case, even if polishing of the composite 12 is not performed, the current collector 11 and the active material molded body 121 can be connected.

The voids of the composite 12 reduces the contact area, and when the contact area is reduced, the resistance increases and the characteristics of the battery is degraded. However, according to the embodiment, the voids of the composite 12 can be filled with the electrolytic solution 123 by the simple process of attaching the PGE film 3 to the composite 12. Besides, in the lithium battery 100, when the charge-discharge cycle is repeated, the volume of the active material molded body 121 or the solid electrolyte 122 can change. For example, even when the volume is contracted and the voids are widened, the electrolytic solution exudes from the PGE film 3, and the voids are filled. On the other hand, even when the volume expands and the voids are narrowed, the electrolytic solution in the voids permeates the PGE film 3. As stated above, the voids of the composite 12 become buffer spaces to absorb the volume variation, and a charge conduction path is secured. That is, the high output battery can be obtained.

Incidentally, since the electrolytic solution 123 (ionic liquid in the PGE film) is small in amount and is nonvolatile, there is no problem of liquid leakage and firing.

3. Embodiment

3-1. Manufacture of Sample

3-1-1. Experimental Example 1

In this example, $LiCoO_2$ was used as the material of the active material molded body 121, $Li_{0.35}La_{0.55}TiO_3$ was used as the material of the solid electrolyte 122, and $Li_2SiO_3$ was used as the material of the solid electrolyte 123.

First, the active material molded body 121 was formed (step S1). Specifically, 100 mass parts of powdered $LiCoO_2$ (made by Sigma-Aldrich Co., Ltd.) and 3 mass parts of powdered polyacrylic acid (PAA) (made by Sigma-Aldrich Co., Ltd.) were mashed in a mortar and were mixed. The 80 mg of the mixed powder was put in a dice of 10 mmϕ, was pressurized and was molded into a disk-shaped pellet. The molded pellet was heat-treated and sintered at 1000° C. for 8 hours in an alumina crucible under which powder of $LiCoO_2$ was laid. In the heat treatment, a temperature rising rate was 3° C./minute, a temperature falling rate was 3° C./minute till 500° C., and the porous active material molded body was formed. The thickness of the obtained active material molded body was about 300 μm.

Next, the solid electrolyte 122 was formed (step S2). First, a precursor solution was adjusted for formation of the solid electrolyte 122. Specifically, 0.799 g of powdered amorphous titania (made by Sigma-Aldrich Co., Ltd.) was resolved in 35 ml of 30% $H_2O_2$ solution. After 9 ml of 35% $NH_3$ solution was added to the obtained solution, the solution was left at rest while being cooled by water for one hour. Then, 2.10 g of citric acid hydrate (made by KANTO CHEMICAL Co., Inc.) was added to the obtained solution, and the solution was agitated while being heated at 60° C. for 30 minutes. The obtained solution was vaporized, dried and solidified. Further, the deposited solid was added with pure water and was dissolved, so that a solution (hereinafter referred to as Ti-CA solution) of peroxo citric acid titanium ammonium salt (hereinafter referred to as Ti-CA), which was a light yellow solution, was obtained. The Ti-CA solution was adjusted to have 0.5 mol/kg. At this time, pH was 6 to 7. $LiNO_3$ (made by KANTO CHEMICAL Co., Inc.) and $La(NO_3)_3 \cdot 6H_2O$ (made by KANTO CHEMICAL Co., Inc.) were added to the Ti-CA solution so that metal atoms were contained at a composition ratio in accordance with the composition formula of $Li_{0.35}La_{0.55}TiO_3$. Further, citric acid hydrate was added to dissolve the metal salt, and 35% $NH_3$ solution was added, so that the precursor solution containing a precursor of 0.5 mol/kg in terms of Ti composition ratio of $Li_{0.35}La_{0.55}TiO_3$ was adjusted. The pH thereof was 6 to 7.

The precursor solution was impregnated in the active material molded body, and after being dried at 60° C., the molded body was heated to 200° C., so that the precursor was adhered to the active material molded body. The operation from the impregnation of the liquid body into the active material molded body to the heating to 200° C. was repeated so that the mass of the precursor adhered to the active material molded body reached 15 mg which was a set amount. After the set amount of precursor was adhered to the active material molded body, the whole was heated and sintered at 700° C.

Next, the solid electrolyte 122 was formed. First, a precursor solution was adjusted for formation of the solid electrolyte 122. Specifically, n-decanoic acid solution (0.2 mol/kg) of $Li(OCOCO_{17}H_{35})_2$(lithium stearate) and p-xylene solution (1.0 mol/kg) of PDMS (polymethylsiloxane) were mixed. Further, a small amount of n-octane was added as a buffer solvent for the n-decanoic acid solution and the p-xylene solution. In this way, the precursor solution was adjusted.

The precursor solution was impregnated in the composite of the active material molded body 121 and the solid electrolyte 122 (step S3) and was dried. After the drying, the composite impregnated with the precursor solution was heat-treated at 300° C. (step S4). When the composite was heated to 300° C., $Li_2SiO_3$ was melted and wetted the whole of the composite. After several minutes passed after the melting, the melted $Li_2SiO_3$ was impregnated in the composite.

Next, the PGE film was attached (step S3). The manufacturing method of the PGE film was as already described. In the experimental example 1, a wait was made until the electrolytic solution was applied (permeated) into the composite after the attachment of the PGE film, and evaluation was made.

3-1-2. Experimental Example 2

This example is similar to the experimental example 1 except that evaluation was immediately made without waiting for the passage of time until the electrolytic solution was applied into the composite after the attachment of the PGE film.

3-2. Evaluation of Samples

Charge-discharge characteristics were evaluated for the experimental examples 1 and 2. In the samples of the experimental examples 1 and 2, aluminum was used as a positive electrode, and lithium and copper were used as a negative electrode, respectively. With respect to the positive electrode, an aluminum plate was attached to a polished surface and the electrode was formed. With respect to the negative electrode, first, a lithium-resistant layer was formed. The lithium-resistant layer was formed by applying, drying and solidifying a liquid composite made of polymethyl methacrylate (PMMA) (made by Soken Chemical & Engineering Co., Ltd.), $LiCoO_2$, ethylene carbonate (made by Sigma-Aldrich Co., Ltd.) and dimethyl carbonate (made by Sigma-Aldrich Co., Ltd.). Further, a lithium metal foil and a copper foil were sequentially laminated from the lithium-resistant layer, and these were crimped, so that the negative electrode was formed. The evaluation of charge-discharge characteristics for the samples obtained in this way was performed.

The charge-discharge characteristics were measured by using a multi-channel charge-discharge evaluation apparatus (made by HOKUTO DENKO CORPORATION, HJ1001SD8). The measurement was performed under conditions of a current density of 0.1 mA/cm, constant current-constant voltage of a charge upper limit voltage of 4.2 V, and constant current driving of a discharge lower limit voltage of 3.0 V.

Figure 7:
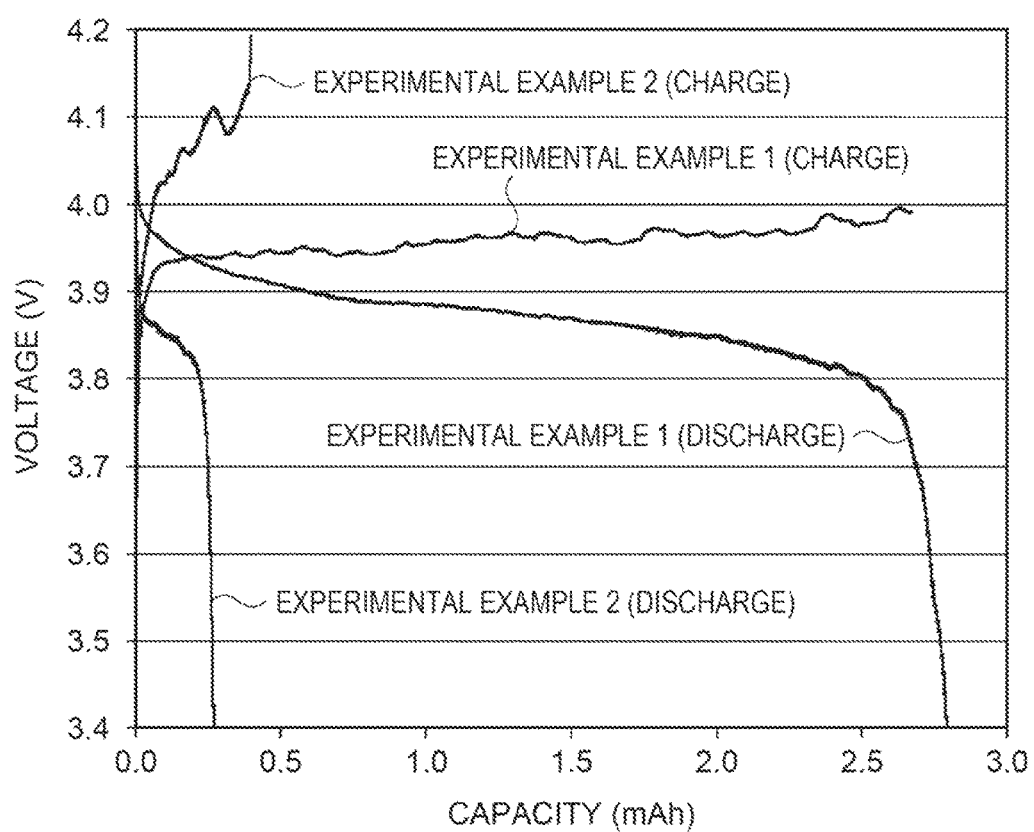
FIG. 7 is a view showing charge-discharge characteristics of experimental examples.

FIG. 7 is a view showing the charge-discharge characteristics of the experimental examples 1 and 2. When the experimental example 1 and the experimental example 2 are compared, the experimental example 1 shows more excellent charge-discharge characteristics. That is, the charge-discharge characteristics are improved by adopting the structure in which the electrolytic solution from the PGE film is impregnated.

What is claimed is:

1. A manufacturing method of an electrode assembly, comprising:
    forming an active material molded body which contains lithium double oxide and includes a plurality of voids, a volume percentage of voids in the active material molded body being 10% to 50%;
    forming a composite in which a crystalline electrolyte is formed in the plurality of voids, a filling ratio of the crystalline electrolyte in the voids being 60% to 90%;
    attaching a polymer gel film impregnated with an electrolytic solution for conducting lithium ions to the composite; and
    causing the electrolytic solution to be permeated in the composite through the crystalline electrolyte.

2. The manufacturing method according to claim 1, wherein the electrolytic solution contains lithium N, N-bis (trifluoromethane sulfonyl) imide and N-methyl-N-propyl pyrrolidinium bis(trifluoromethane sulfonyl) imide.

3. The manufacturing method according to claim 1, wherein the crystalline electrolyte contains $Li_{0.35}La_{0.55}TiO_3$.

4. The manufacturing method according to claim 1, wherein the active material molded body contains $LiCoO_2$.

5. The manufacturing method according to claim 1, wherein the resistivity of the active material molded body is 700 Ω/cm or less.

6. The manufacturing method according to claim 1, wherein a mass reduction rate of the composite is 1 mass % or less.

7. An electrode assembly comprising:
    an active material molded body which contains lithium double oxide and includes a plurality of voids, a volume percentage of voids in the active material molded body being 10% to 50%;
    a crystalline electrolyte provided in the plurality of voids, a filling ratio of the crystalline electrolyte in the voids being 60% to 90%; and
    a polymer gel film attached to a composite including the active material molded body and the crystalline electrolyte and impregnated with an electrolytic solution for conducting lithium ions,
    wherein a part of the electrolytic solution is permeated in the composite through the crystalline electrolyte.

8. The electrode assembly according to claim 7, wherein the electrolytic solution contains lithium N, N-bis(trifluoromethane sulfonyl) imide and N-methyl-N-propyl pyrrolidinium bis(trifluoromethane sulfonyl) imide.

9. The electrode assembly according to claim 7, wherein the crystalline electrolyte contains $Li_{0.35}La_{0.55}TiO_3$.

10. The electrode assembly according to claim 7, wherein the active material molded body contains $LiCoO_2$.

11. A battery comprising the electrode assembly according to claim 7.

12. The electrode assembly according to claim 7, wherein the resistivity of the active material molded body is 700 Ω/cm or less.

13. The electrode assembly according to claim 7, wherein a mass reduction rate of the composite is 1 mass % or less.

* * * * *